(12) United States Patent
Nakahata et al.

(10) Patent No.: US 9,712,069 B2
(45) Date of Patent: Jul. 18, 2017

(54) DISTRIBUTED-CONSTANT TYPE TRANSFORMER FOR VOLTAGE CONVERSION

(71) Applicants: Sumitomo Electric Industries, Ltd., Osaka-shi (JP); NATIONAL UNIVERSITY CORPORATION TOYOHASHI UNIVERSITY OF TECHNOLOGY, Toyohashi-shi (JP)

(72) Inventors: Hideaki Nakahata, Osaka (JP); Nobuo Shiga, Osaka (JP); Kenichi Hirotsu, Osaka (JP); Takashi Ohira, Toyohashi (JP); Kyohei Yamada, Toyohashi (JP)

(73) Assignees: Sumitomo Electric Industries, Ltd., Osaka-shi (JP); National University Corporation Toyohashi University of Technology, Toyohashi-shi (JP)

( * ) Notice: Subject to any disclaimer, the term of this patent is extended or adjusted under 35 U.S.C. 154(b) by 0 days.

(21) Appl. No.: 14/906,517

(22) PCT Filed: Aug. 5, 2014

(86) PCT No.: PCT/JP2014/070631
§ 371 (c)(1),
(2) Date: Jan. 20, 2016

(87) PCT Pub. No.: WO2015/029720
PCT Pub. Date: Mar. 5, 2015

(65) Prior Publication Data
US 2016/0204708 A1 Jul. 14, 2016

(30) Foreign Application Priority Data

Aug. 29, 2013 (JP) ................. 2013-178522

(51) Int. Cl.
*H02M 5/10* (2006.01)
*H02M 5/293* (2006.01)

(52) U.S. Cl.
CPC ............. *H02M 5/10* (2013.01); *H02M 5/293* (2013.01)

(58) Field of Classification Search
USPC .......................................................... 333/35
See application file for complete search history.

(56) References Cited

U.S. PATENT DOCUMENTS

| 5,652,546 A * | 7/1997 | Dent ..................... H03F 1/0244 330/276 |
| 6,121,852 A * | 9/2000 | Mizoguchi ........... G01R 33/028 333/204 |
| 2011/0149606 A1 | 6/2011 | Ho et al. |
| 2012/0326774 A1 | 12/2012 | Hatsukawa et al. |

FOREIGN PATENT DOCUMENTS

| JP | 2000-124711 A | 4/2000 |
| JP | 2000-278951 A | 10/2000 |

(Continued)

OTHER PUBLICATIONS

Homepage of Chubu Electric Power Co., Inc., [Pole Transformer], [online], Internet <URL:http://www.chuden.co.jp/kids/kids_denki/home/hom_kaku/> corresponding to previous <URL:http://www.chuden.co.jp/e-museum/guide/3floor/exhibit_c23.html.> [searched on Jul. 19, 2013].

(Continued)

*Primary Examiner* — Matthew Nguyen
*Assistant Examiner* — Ishrat Jamali
(74) *Attorney, Agent, or Firm* — Venable LLP; Michael A Sartori; Laura G. Remus

(57) ABSTRACT

A transformer of distributed-constant type is provided between an AC power supply with a frequency f and a load with a resistance value R, and includes: a first converter (Continued)

connected to the AC power supply and having a length of $\lambda/4$; and a second converter provided between an end of the first converter and the load, and having a length of $\lambda/4$, where a wavelength at the frequency f is $\lambda$. Such a transformer has a small size and a light weight, and does not need a coil, an iron core, and the like as used in a conventional transformer.

6 Claims, 8 Drawing Sheets

(56) References Cited

FOREIGN PATENT DOCUMENTS

| JP | 2002-095241 A | 3/2002 |
|---|---|---|
| JP | 2002-272123 A | 9/2002 |
| JP | 2002-272127 A | 9/2002 |
| JP | 2004-236169 A | 8/2004 |
| JP | 2008-061143 A | 3/2008 |
| JP | 2009-200609 A | 9/2009 |
| JP | 2009-268004 A | 11/2009 |

OTHER PUBLICATIONS

Falcones et al., "Topology Comparison for Solid State Transformer Implementation," Power and Energy Society General Meeting, 2010 IEEE, pp. 1-8, Minneapolis, Jul. 2010.

Office Action in Japanese Patent Application No. 2013-178522, dated Jan. 6, 2015.

International Search Report in International Application No. PCT/JP2014/070631, dated Nov. 4, 2014.

Extended European Search Report in counterpart European Patent Application No. 14840882.6, dated Mar. 3, 2017.

* cited by examiner

DISTRIBUTED-CONSTANT TYPE TRANSFORMER FOR VOLTAGE CONVERSION

TECHNICAL FIELD

The present invention relates to a transformer.

BACKGROUND ART

In a commercial AC transmission and distribution system, a transformer is used. Just near a consumer's house, a pole transformer is used which transforms, for example, 6600 V (50 Hz or 60 Hz) to 200 V (see NON PATENT LITERATURE 1). Such a pole transformer has a thick coil as a conductive wire wound around an iron core, and therefore has a considerable weight. For example, a pole transformer with a diameter of 40 cm and a height of 80 cm has a weight of about 200 kg, including an insulating oil and a case.

On the other hand, for realizing a smart grid which is a next-generation power system, studies of an SST (Solid-State Transformer) are being conducted. For the SST, a high-frequency transformer is used (for example, see NON PATENT LITERATURE 2).

CITATION LIST

Non Patent Literature

NON PATENT LITERATURE 1: Homepage of Chubu Electric Power Co., Inc., [Pole Transformer], [online], [searched on Jul. 19, 2013], Internet <URL:http://www.chuden.co.jp/e-museum/guide/3floor/exhibit_c23.html>

NON PATENT LITERATURE 2: Falcones, S.: et al., Power and Energy Society General Meeting, 2010 IEEE, pp. 1-8, Minneapolis, July 2010

SUMMARY OF INVENTION

Technical Problem

A conventional pole transformer is heavy, and therefore is not easy to handle. In addition, an attachment space that is large enough to contain the outer dimension of the transformer is needed on the pole.

On the other hand, a high-frequency transformer cannot avoid an influence of a parasitic capacitance, and has a difficulty in designing.

Considering such conventional problems, an object of the present invention is to provide an innovative next-generation transformer with a small size and a light weight, which does not need a coil, an iron core, and the like for magnetic coupling, electromagnetic induction, or mutual inductance as used in a conventional transformer.

Solution to Problem

The present invention is a transformer, of distributed-constant type, provided between an AC power supply with a frequency f and a load with a resistance value R, the transformer including: a first converter connected to the AC power supply and having a length of λ4; and a second converter provided between an end of the first converter and the load, and having a length of λ/4, where a wavelength at the frequency f is λ.

Advantageous Effects of Invention

Using the transformer of the present invention as a power transformer makes it unnecessary to use a conventional transformer including a coil, an iron core, and the like. Therefore, it becomes possible to realize dramatic size reduction and weight reduction of a transformer, and thereby realize cost reduction.

DESCRIPTION OF EMBODIMENTS

Summary of Embodiments

Figure 1:
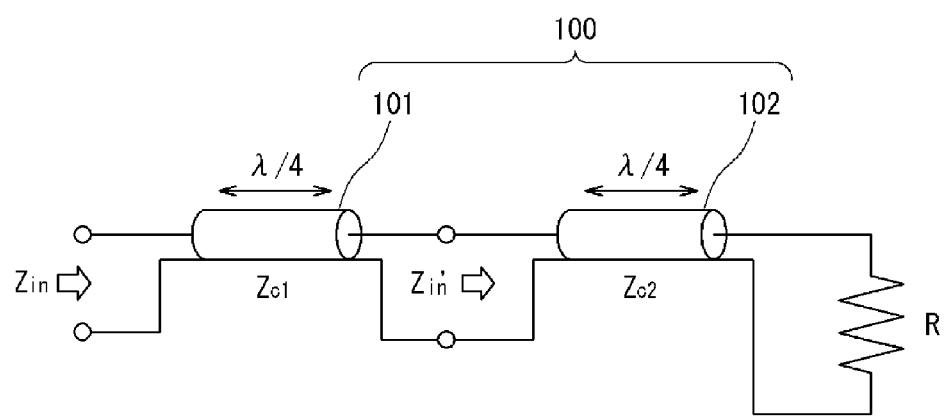
FIG. 1 is a connection diagram showing a transformer using a distributed constant circuit.

Summary of embodiments of the present invention includes at least the following.

(1) A transformer of distributed-constant type is provided between an AC power supply with a frequency f and a load with a resistance value R, and includes: a first converter connected to the AC power supply and having a length of λ/4; and a second converter provided between an end of the first converter and the load, and having a length of λ/4, where a wavelength at the frequency f is λ.

In the above transformer, in the case where the impedance of the first converter is $Z_{c1}$ and the impedance of the second converter is $Z_{c2}$, an input impedance $Z_{in}$ is shown as follows.

$$Z_{in}=(Z_{c1}^2/Z_{c2}^2) \cdot R = k \cdot R$$

Here, k is a constant. The input impedance $Z_{in}$ is proportional to the resistance value R of the load. Thus, regardless of the resistance value of the load, output voltage proportional to input voltage can be obtained. That is, a transformer that transforms input voltage to output voltage with a constant voltage transformation ratio $(1/k)^{1/2}$ can be obtained. This transformer is formed by connecting two stages of distributed constant circuits. Therefore, an innovative configuration that does not need a winding, an iron core, and the like as used in a conventional transformer can be obtained, whereby weight reduction of a transformer can be realized, and as a result, cost reduction can be realized. Further, problems of parasitic capacitance and occurrence of magnetic field leakage, which arise in a high-frequency transformer, are also solved, and thus a transformer with low loss can be realized.

(2) A transformer may include a circuit configured to perform switching, and the transformer of (1) which is interposed in the circuit.

In this case, it is possible to utilize a distributed-constant-type transformer, using an environment in which switching is performed at a high frequency.

(3) In the transformer of (1), the first converter and the second converter may be each formed by a cable.

In this case, it is possible to make the characteristic impedances of the cables be the respective impedances of the first converter and the second converter.

(4) In the transformer of (3), the cable may be integrated with a power cable of a distribution line.

In this case, the power cable can be used as the transformer.

(5) In the transformer of (3) or (4), it is desirable that the frequency of the AC power supply is at least 1 MHz.

In this case, for example, if the frequency is 10 MHz, λ/4 is several meters, and therefore it is practically easy to realize the transformer by a cable. In addition, if the frequency is 1 MHz, λ/4 is several ten meters, and the transformer can be realized by being integrated with the power cable of the distribution line.

Details of Embodiments

<Transformer Using Distributed Constant Circuit>

Next, a transformer using a distributed constant circuit according to one embodiment of the present invention will be described.

<<Basic Configuration>>

FIG. 1 is a connection diagram showing a transformer 100 using a distributed constant circuit. In FIG. 1, the transformer 100 is composed of a first converter 101, and a second converter 102 connected to an end of the first converter 101. As the first converter 101 and the second converter 102, for example, a sheathed single-core cable (CV) can be used. The first converter 101 at the preceding stage has a length of λ/4 (λ is wavelength) with respect to an inputted frequency f from the power supply. Also, the second converter 102 at the subsequent stage, which is connected to the end of the first converter 101, has a length of λ/4 with respect to the inputted frequency f from the power supply.

Here, in the case where the characteristic impedances of the first converter 101 and the second converter 102 are $Z_{c1}$ and $Z_{c2}$, respectively, an input impedance as seen from an input end of the first converter 101 is $Z_{in}$, and an input impedance as seen from an input end of the second converter 102 is $Z_{in}'$, the following is obtained.

$$Z_{in}=Z_{c1}^2/Z_{in}', \quad Z_{in}'=Z_{c2}^2/R$$

Therefore, $Z_{in}$ is shown as follows.

$$Z_{in} = Z_{c1}^2/(Z_{c2}^2/R)$$
$$= (Z_{c1}^2/Z_{c2}^2)R$$

Since $(Z_{c1}^2/Z_{c2}^2)$ is a constant, this is defined as a constant k.

Then, $Z_{in}=k\cdot R$ is obtained.

In addition, in the case where, regarding the entire transformer 100, the input voltage is $V_{in}$, the input power is $P_{in}$, the output power is $P_{out}$, and the output voltage is $V_{out}$, $P_{in}$ and $P_{out}$ are shown as $P_{in}=V_{in}^2/Z_{in}$, $P_{out}=V_{out}^2/R$. Here, since $P_{in}=P_{out}$ is satisfied, the following relationship is obtained.

$$V_{in}^2/Z_{in}=V_{out}^2/R$$

This is deformed to $$(V_{out}^2/V_{in}^2)=R/Z_{in}=k$$

Therefore, $(V_{out}/V_{in})=k^{1/2}$ is obtained.

Thus, a constant voltage transformation ratio $k^{1/2}$ is obtained.

Thus, the input impedance $Z_{in}$ is proportional to the resistance value R of the load, and the voltage transformation ratio is constant regardless of load variation. In other words, regardless of the resistance value of the load, output voltage proportional to input voltage can be obtained. That is, the transformer 100 that transforms input voltage to output voltage with a constant voltage transformation ratio $(1/k)^{1/2}=Z_{c2}/Z_{c1}$ can be obtained. In addition, the voltage transformation ratio can be freely designed by selection of the value of $Z_{c2}/Z_{c1}$.

This transformer is formed by connecting two stages of distributed constant circuits. Therefore, an innovative configuration that does not need a winding, an iron core, and the like as used in a conventional transformer can be obtained, whereby weight reduction of a transformer can be realized, and as a result, cost reduction can be realized. Further, problems of parasitic capacitance and occurrence of magnetic field leakage, which arise in a high-frequency transformer, are also solved, and thus a transformer with low loss can be realized.

Theoretically, the above transformer 100 can be realized even by using a low frequency at a commercial frequency level, but practically, λ/4 becomes very long, and therefore such a frequency is not suitable. However, in the case of 1 MHz, the value of λ/4 is several ten meters, and therefore the above transformer 100 can be realized by being integrated with a power cable of a distribution line. Further, in the case of 10 MHz, the value of λ/4 is several meters, and therefore the realization by a cable is practically easy.

The transformer 100 using the distributed constant circuits as described above may be used in combination with a transformer having another configuration. The following is examples of such a transformer having another configuration.

<Transformer Using Switching by Reactance Element>

Figure 2:
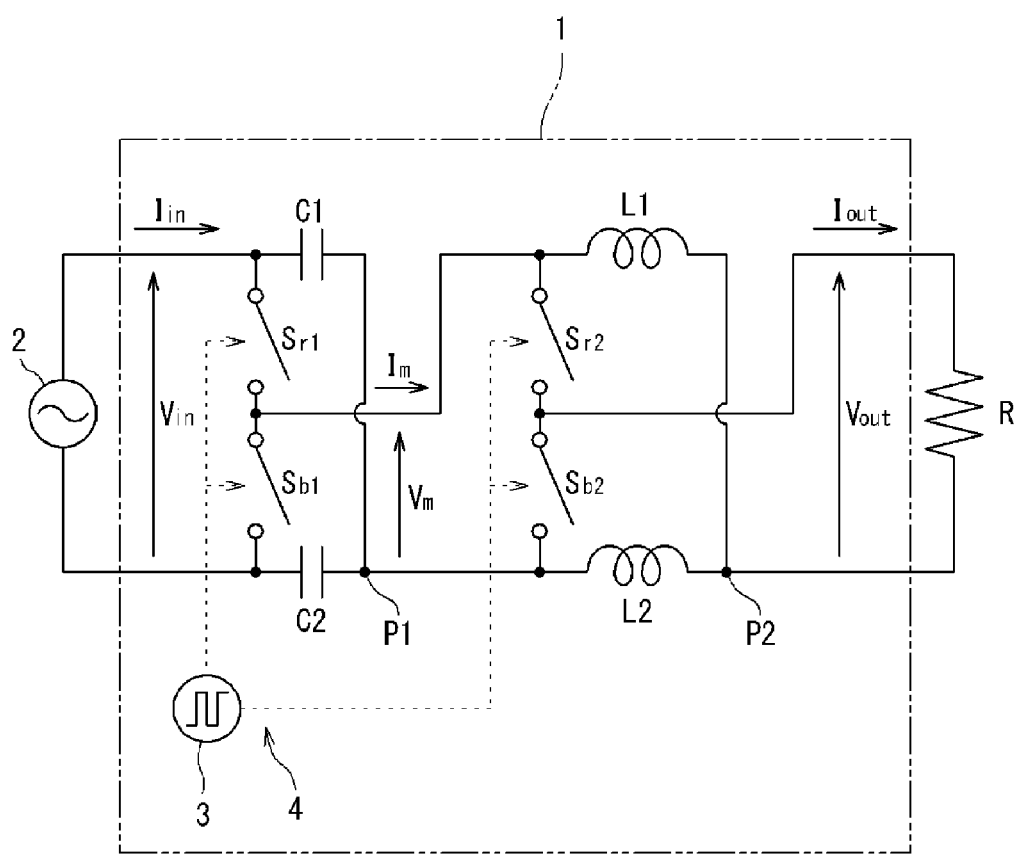
FIG. 2 is a circuit diagram showing a transformer having another configuration.

FIG. 2 is a circuit diagram showing an example of such a transformer 1. In FIG. 2, the transformer 1 is provided between an AC power supply 2 and a load R. The transformer 1 includes a pair of capacitors C1 and C2, a pair of inductors L1 and L2, four switches $S_{r1}$, $S_{r2}$, $S_{b1}$, and $S_{b2}$, and a switching control section 3 which performs ON/OFF control of the switches $S_{r1}$, $S_{r2}$, $S_{b1}$, and $S_{b2}$. A switching frequency of the switching control section 3 is, for example, about 1 MHz. The switching frequency is preferably equal to or higher than 1 MHz, but may be lower than 1 MHz.

The switches $S_{r1}$, $S_{r2}$, $S_{b1}$, and $S_{b2}$ and the switching control section 3 form a switch device 4 which switches the state of circuit connection of the transformer 1. The switches $S_{r1}$ and $S_{r2}$ operate in synchronization with each other, and the switches $S_{b1}$ and $S_{b2}$ operate in synchronization with each other. The pair of switches $S_{r1}$ and $S_{r2}$ and the pair of switches $S_{b1}$ and $S_{b2}$ operate so as to be alternately turned on exclusively from each other. The switches $S_{r1}$, $S_{r2}$, $S_{b1}$, and $S_{b2}$ are semiconductor switching elements formed by an SiC element or a GaN element, for example. An SiC element or a GaN element allows faster switching than an Si element, for example. In addition, sufficient withstand voltage (which can be even 6 kV per element, for example) can be obtained without connecting multiple stages of such elements.

In FIG. 2, the pair of capacitors C1 and C2 are connected in series to each other via a connection point P1. The AC power supply 2 is connected between both ends of this series unit. The input voltage $V_{in}$ is applied to the series unit of the pair of capacitors C1 and C2, so that input current $I_{in}$ flows.

The pair of inductors L1 and L2 are connected in series to each other via a connection point P2. Between both ends of this series unit, input voltage $V_m$ is applied via the capacitors C1 and C2, so that input current $I_m$ flows. When one of the switches $S_{r1}$ and $S_{b2}$ is ON, current flows in the load R. Here, voltage applied to the load R is $V_{out}$, and output current flowing from the transformer 1 to the load R is $I_{out}$.

Figure 3:
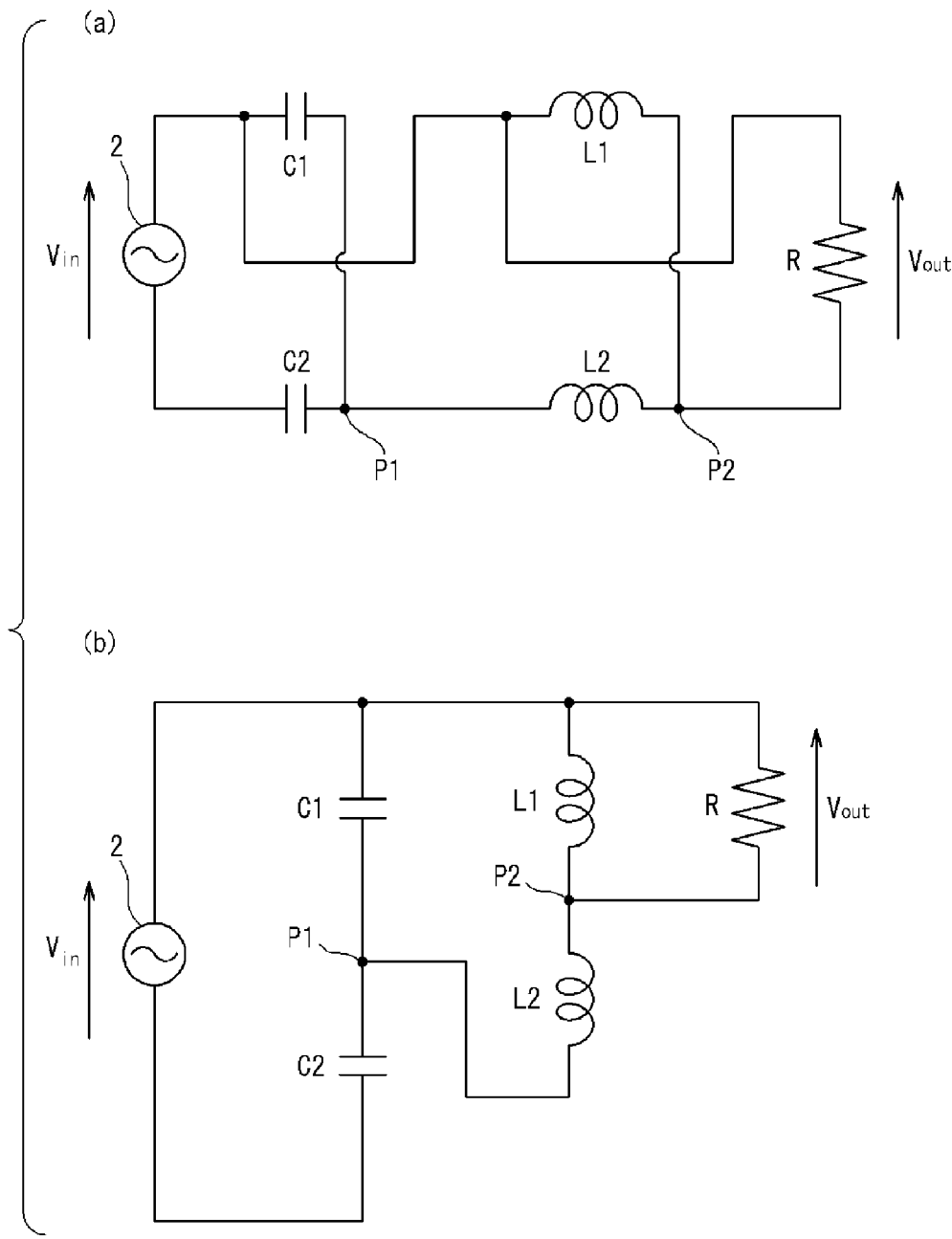
FIG. 3 is a circuit diagram in which (a) shows a substantial connection state when, of four switches in FIG. 2, two switches on the upper side are ON and two switches on the lower side are OFF, and (b) shows, in a step-like shape, the same circuit diagram as in (a).

In FIG. 3, (a) is a circuit diagram showing a substantial connection state when, of the four switches $S_{r1}$, $S_{r2}$, $S_{b1}$, and $S_{b2}$ in FIG. 2, the two switches $S_{r1}$ and $S_{r2}$ on the upper side are ON and the two switches $S_{b1}$ and $S_{b2}$ on the lower side are OFF. In the drawing, the switch device 4 in FIG. 2 is not shown. In FIG. 3, (b) is a circuit diagram showing, in a step-like shape, the same circuit diagram as in (a).

Figure 4:
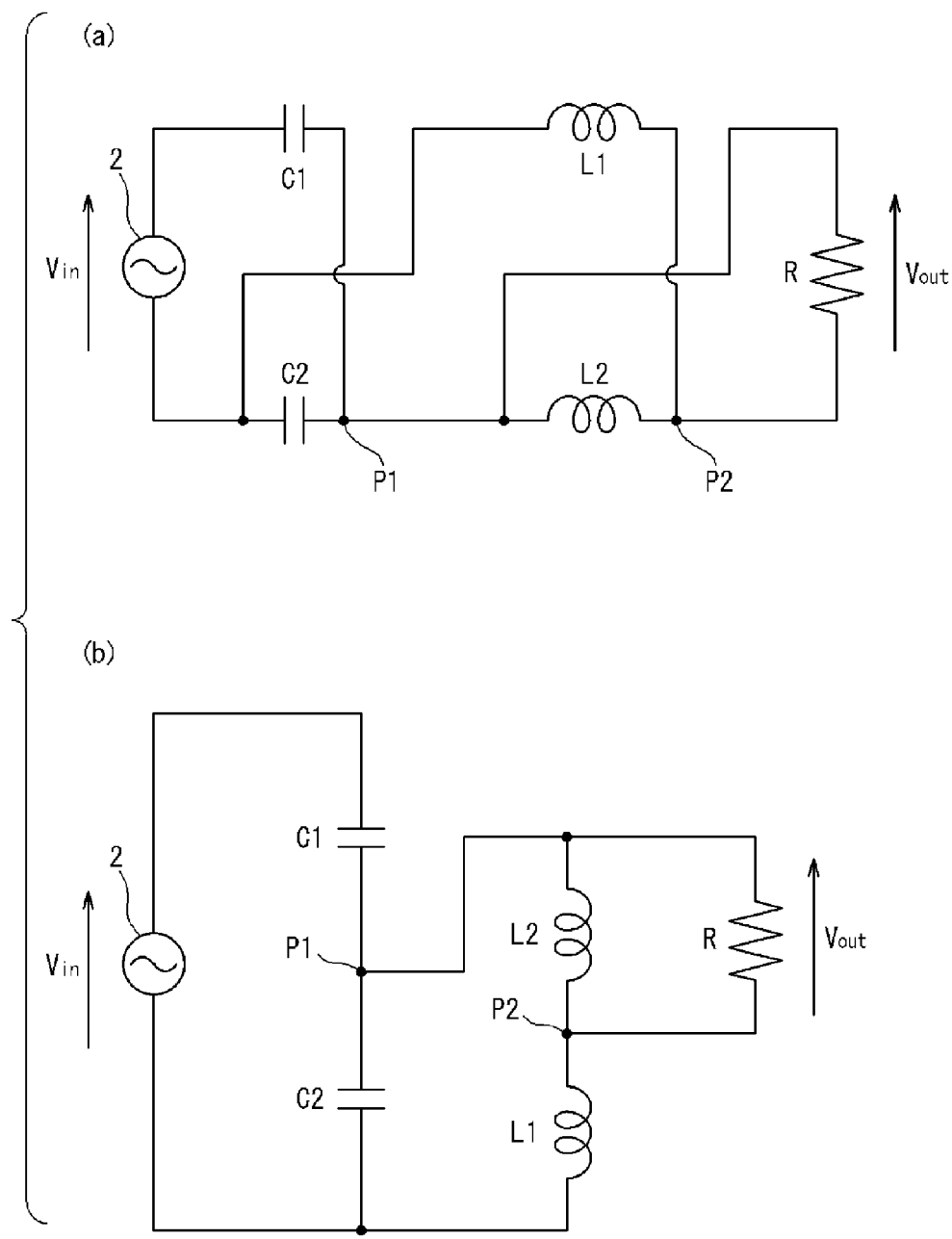
FIG. 4 is a circuit diagram in which (a) shows a substantial connection state when, of the four switches in FIG. 2, the two switches on the lower side are ON and the two switches on the upper side are OFF, and (b) shows, in a step-like shape, the same circuit diagram as in (a).

On the other hand, in FIG. 4, (a) is a circuit diagram showing a substantial connection state when, of the four switches $S_{r1}$, $S_{r2}$, $S_{b1}$, and $S_{b2}$ in FIG. 2, the two switches $S_{b1}$ and $S_{b2}$ on the lower side are ON and the two switches $S_{r1}$ and $S_{r2}$ on the upper side are OFF. In FIG. 4, (b) is a circuit diagram showing, in a step-like shape, the same circuit diagram as in (a).

While the states in FIG. 3 and FIG. 4 are alternately repeated, voltage obtained via the connection point P1 of the series unit of the capacitors C1 and C2 becomes voltage obtained via the connection point P2 of the series unit of the inductors L1 and L2. That is, transformation is performed from the capacitor side at the preceding stage to the inductor side at the subsequent stage. Here, it is estimated that the input voltage becomes ¼ to be outputted. This has been confirmed by experiments by the inventors.

Figure 5:
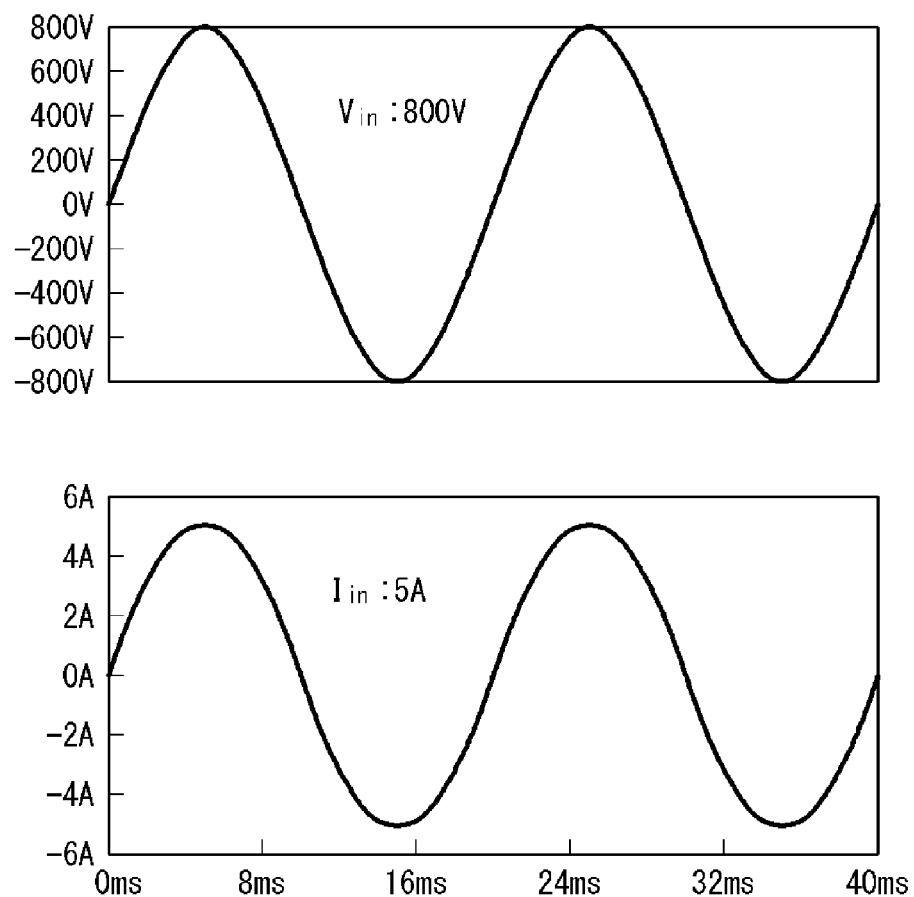
FIG. 5 is waveform diagrams respectively showing input voltage and input current to the transformer in FIG. 2.

FIG. 5 is waveform diagrams, the upper one showing the input voltage to the transformer 1, and the lower one showing the input current to the transformer 1.

Figure 6:
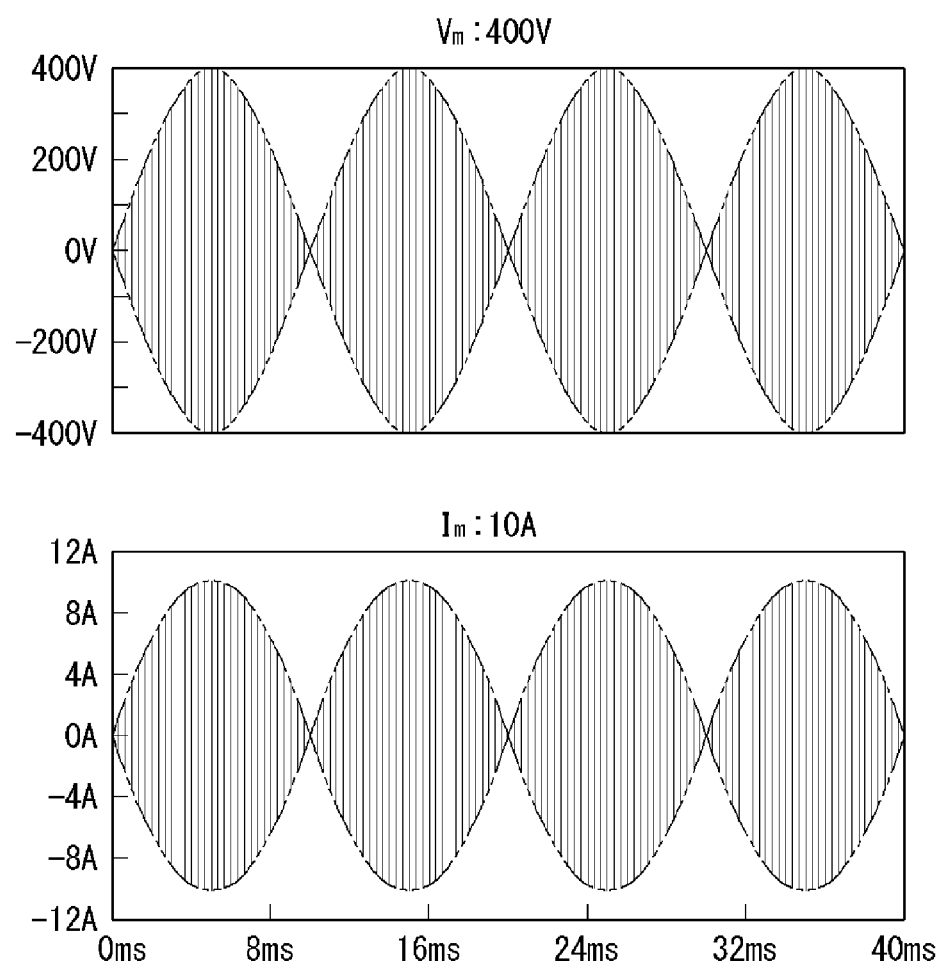
FIG. 6 is waveform diagrams respectively showing voltage and current at an intermediate stage of transformation in the transformer in FIG. 2.

FIG. 6 is waveform diagrams respectively showing the voltage $V_m$ and the current $I_m$ at an intermediate stage of transformation. Each waveform is actually formed by a pulse train based on switching, and as a whole, represented by the waveform as shown in FIG. 6.

Figure 7:
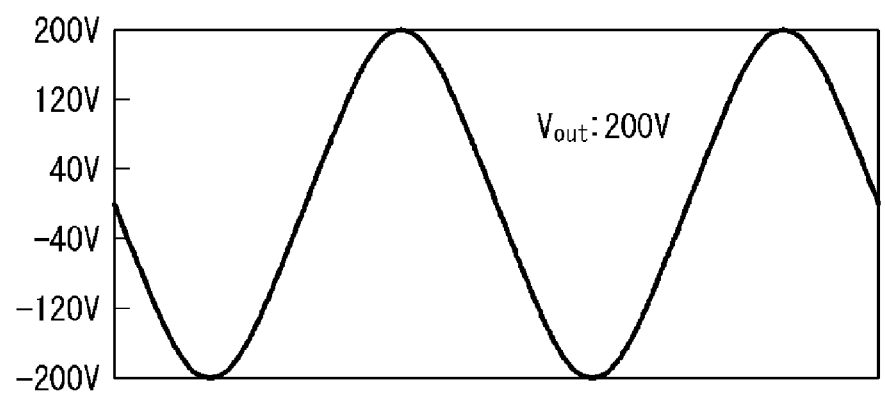
FIG. 7 is waveform diagrams respectively showing output voltage and output current from the transformer in FIG. 2.
Figure 7:
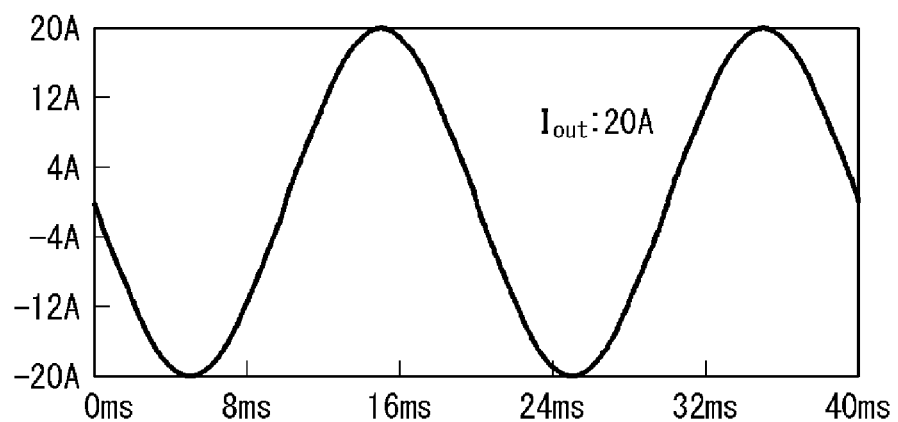

FIG. 7 is waveform diagrams, the upper one showing the output voltage from the transformer 1, and the lower one showing the output current from the transformer 1. As is obvious from comparison between FIG. 5 and FIG. 7, the voltage is transformed to ¼, and along with this, the current quadruples.

<Combination Examples>

Figure 8:
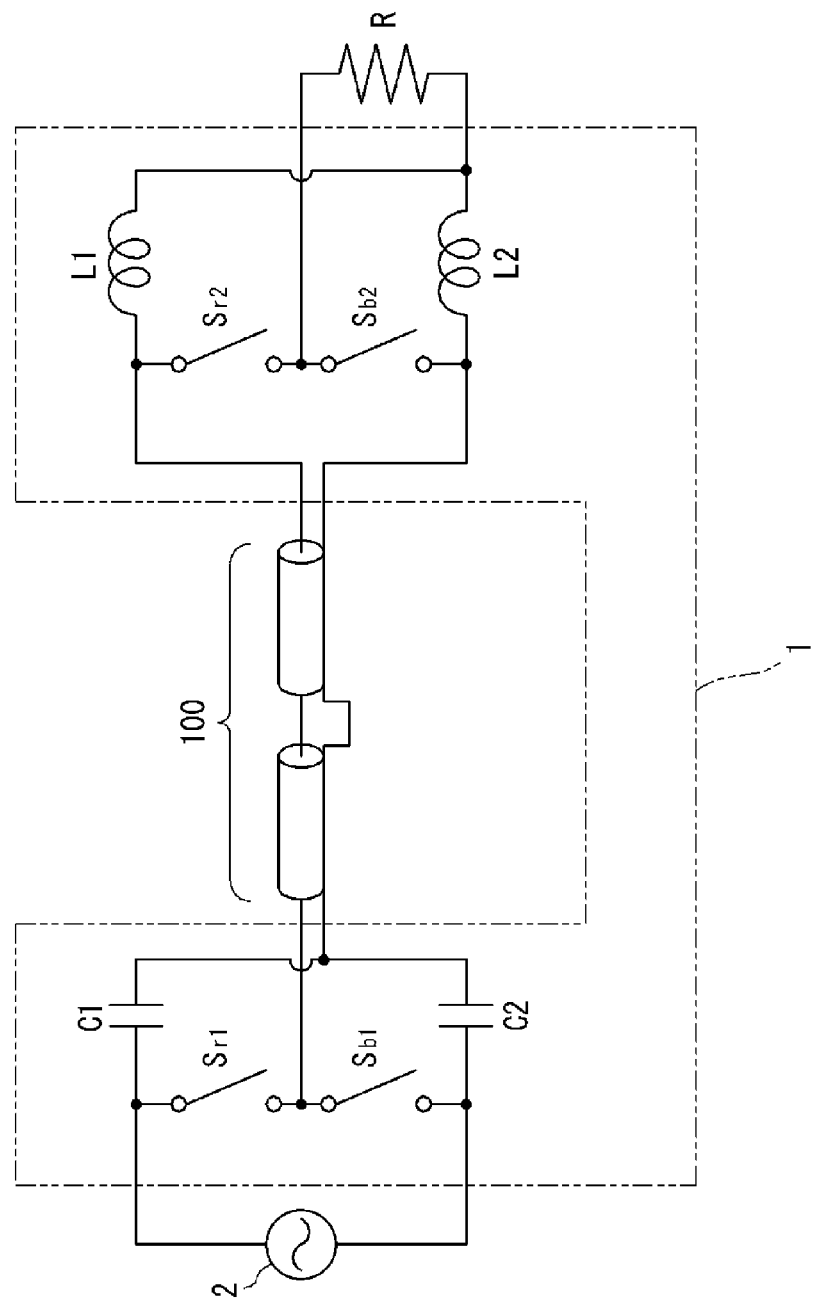
FIG. 8 is a circuit diagram showing a combination of the transformer shown in FIG. 1 and the transformer shown in FIG. 2.

FIG. 8 is a circuit diagram showing a combination of the transformer 100 using the distributed constant circuits, and the transformer 1 shown in FIG. 2. In FIG. 8, the transformer 100 is interposed between the capacitor stage and the inductor stage in the transformer 1 shown in FIG. 2. By thus combining transformation functions of the two kinds of transformers 1 and 100, it becomes possible to design the voltage transformation ratio in a wide range.

In this case, the transformer 1 is a circuit that performs switching at 1 MHz, for example, as described above. By interposing the transformer 100 in such a circuit, it becomes possible to utilize the distributed-constant-type transformer 100, using an environment in which switching is performed at a high frequency of 1 MHz, for example.

In addition, even if the AC power supply 2 is replaced with a DC power supply, a switching waveform based on switching at the preceding stage in the transformer 1 is inputted to the transformer 100, and therefore the transformer 100 can be used.

It is noted that the embodiments disclosed herein are merely illustrative in all aspects and should not be recognized as being restrictive. The scope of the present invention is defined by the scope of the claims, and is intended to include meaning equivalent to the scope of the claims and all modifications within the scope.

REFERENCE SIGNS LIST 1 transformer
2 AC power supply
3 switching control section
4 switch device
100 transformer
101 first converter
102 second converter
C1, C2 capacitor
L1, L2 inductor
$S_{b1}$, $S_{b2}$ switch
$S_{r1}$, $S_{r2}$ switch
P1, P2 connection point
R load

The invention claimed is:

1. A distributed-constant type transformer, for voltage conversion, provided between an AC power supply with a frequency f and a load with a resistance value R, the transformer comprising:
 a first converter connected to the AC power supply and forming a first distributed-constant circuit that has a length of λ/4 from an input end thereof to an output end thereof and a characteristic impedance $Z_{C1}$, λ being a wavelength at the frequency f; and
 a second converter provided between the output end of the first converter and the load, the second converter forming a second distributed-constant circuit that has a length of λ/4 from an input end thereof to an output end thereof and a characteristic impedance $Z_{C2}$,
 wherein
 an input impedance $Z_{in}$ as seen from the input end of the first converter is defined by a relation:

$Z_{in} = (Z_{C1}^2 / Z_{C2}^2) R.$

2. A transformer comprising:
 a circuit configured to perform switching; and
 the transformer according to claim 1, interposed in the circuit.

3. The transformer according to claim 1, wherein the first converter and the second converter are each formed by a cable.

4. The transformer according to claim 3, wherein the cable is integrated with a power cable of a distribution line.

5. The transformer according to claim 4, wherein the frequency of the AC power supply is at least 1 MHz.

6. The transformer according to claim 3, wherein the frequency of the AC power supply is at least 1 MHz.

* * * * *